Jan. 19, 1965 E. H. PAUFVE 3,166,679
SELF-REGENERATIVE, LATCHING, SEMICONDUCTOR
VOLTAGE SELECTION CIRCUIT
Filed April 24, 1961

ELDRED H. PAUFVE
INVENTOR
BY Richard G. Stephens
ATTORNEY

United States Patent Office 3,166,679 Patented Jan. 19, 1965

3,166,679

SELF-REGENERATIVE, LATCHING, SEMICONDUCTOR VOLTAGE SELECTION CIRCUIT

Eldred H. Paufve, Binghamton, N.Y., assignor to Link Division of General Precision, Inc., Binghamton, N.Y., a corporation of Delaware Filed Apr. 24, 1961, Ser. No. 104,897
10 Claims. (Cl. 307—88.5)

Figure 1:
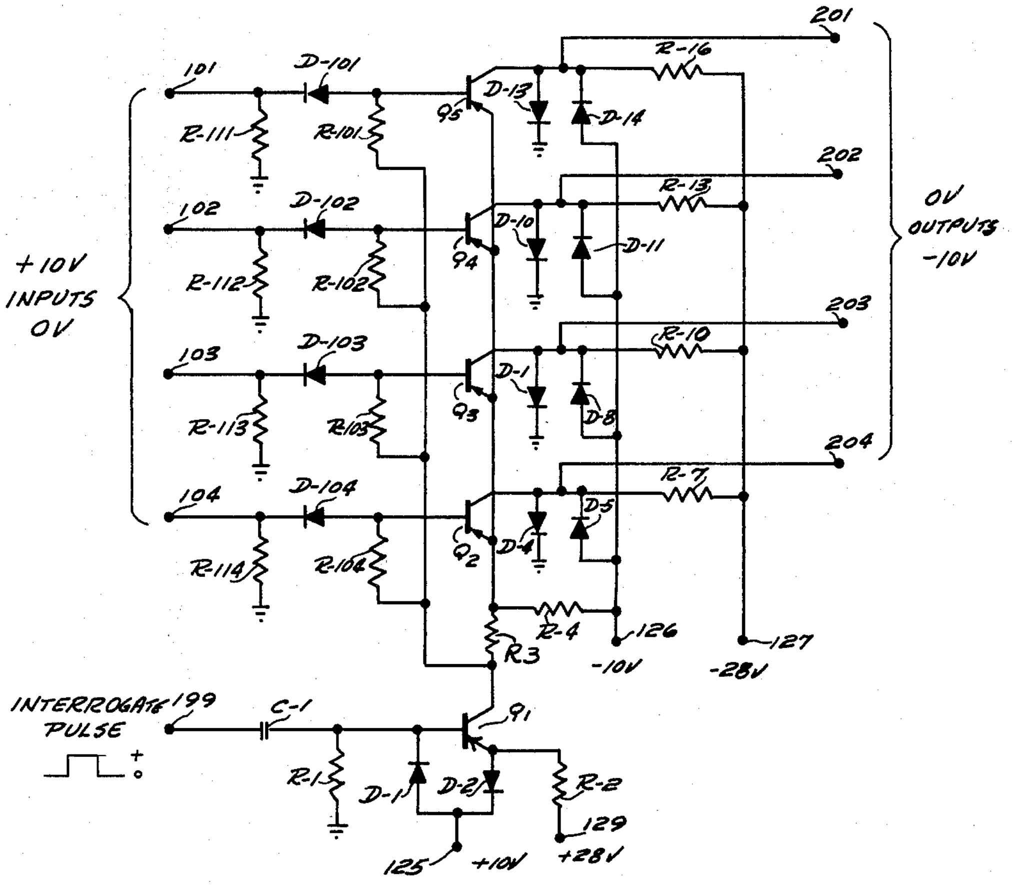

This invention relates to a circuit which, when interrogated, will select and indicate which of several inputs to the circuit is at an extreme (lowest or highest ) potential at the instant of interrogation. Such circuits are very useful in various electronic character recognition or pattern-matching machines, in which the correlation functions between an input pulse train and a succession of individual reference pulse trains are derived as voltages. After selecting the "extreme" voltage, the present invention then will hold or remember the designation of that voltage despite subsequent changes in input level, until a succeeding interrogation is made at some later instant. Thus in a character recognition machine where one character must be selected from a vocabulary of characters on the basis of least dissimilarity, or alternatively, on the basis of greatest similarity, each time a character is viewed optically or sensed magnetically, the circuit will identify the character and then hold the selection until scanning of another character is completed.

The principal objects and advantages of the present invention over prior art devices of the same type are its simplicity and economy, the fact that no standby current is required, and the fact that no loading is presented to the input circuits while any one of the output circuits is active.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which the single figure is an electrical schematic diagram of a preferred embodiment of the invention.

Referring now to the drawing, it will be seen that a plurality of input terminals 101–104 are provided for a plurality of input voltages to be applied to the circuit. While four inputs are shown, any number may be used. Each input voltage is applied between a respective input terminal and ground. While for ease of explanation certain supply voltages and operating levels and polarities have been assumed, it should be noted that each of these may be altered readily by those skilled in the art. The interrogate pulse is applied via terminal 199 shown at lower left. The output lines are shown at the right terminals 201–204; upon interrogation the output line associated with the lowest (most negative) input voltage will be made high (e.g., zero volts) while all the other output lines will remain low (e.g., −10 v). The voltage of the selected "active," (i.e., extreme) output line may be used to actuate any one of a large variety of output devices, such as a relay or a further computer switching circuit (not shown).

The invention advantageously utilizes the self-latching characteristics of thyristors, such as RCA Type 2N1213, for example. In FIG. 1 transistor Q–1 acts as a current source for the plurality of thyristor latches which connect input and output lines, and excepting during application of an interrogate pulse, transistor Q–1 is conducting. The flow of current through resistor R–1 biases transistor Q–1 "on," while diode D–1 clamps the transistor base voltage near +10 volts, so that the voltage across resistor R–2 is determined accurately, and an accurately measured amount of current therefore is supplied to the thyristor latches via the Q–1 transistor collector. Diode D–2 is used to prevent the Q–1 emitter from being made more positive than +10 volts when the interrogate pulse is applied and transistor Q–1 is cut off.

Upon application of a positive interrogate pulse to terminal 199, the Q–1 transistor base is driven positive, cutting off Q–1, and current flowing through resistor R–4 then pulls the emitters of all thyristor latches toward the −10 volt supply level connected to terminal 126, thereby decreasing the potential difference across the latches. Under such conditions, it may be noted that the base-emitter junctions of all thyristors now are reverse-biased by the voltage drop across resistor R–3, and also by the leakage, if any, through the reverse-biased input diodes D–101 to D–104, so that all thyristors are effectively held cut off.

Upon termination of the interrogate pulse, transistor Q–1 immediately begins conducting again, rapidly pulling the emitters of all the thyristor latches toward +10 volts. As this emitter voltage common to the group exceeds (i.e. becomes more positive than) the potential of any one of the input lines, the particular thyristor associated with that input line will being to conduct, preventing any further rise of the group emitter voltage. Because of the inherent self-regenerative or avalanche action of the conducting thyristor it immediately conducts very heavily, so that the voltage across it drops nearly to zero. Then, because each thyristor load resistor (R7, R10, R13, or R16) is selected so that Q–1 current through any one of the thyristors is amply sufficient to raise the collector up to ground (where it is clamped by diode D–4, for example, in the case of line 104 being the extreme), the emitters of all thyristors are also raised to near ground potential. With all thyristor emitters at or near ground potential and all input diodes (D–101 to D–104) back biased (since the inputs were specified as being positive), a condition is reached where one thyristor conducts and all others are cut off, and biased so as to remain cut off. Series resistor R–3 will provide a slight reverse bias via the thyristor base resistors (R–101 to R–104), to insure that the cut off thyristors remain cut off even at rather elevated temperatures. Resistor R–3 may be eliminated if room temperature operation can be assured.

Though shunting resistors (R–111 to R–114) are shown connected to input terminals 101–104, such resistances merely represent input impedance, or load impedance for the driving circuit, and actual resistors are not required. Diodes D–5, D–8, D–11 and D–14 are provided merely to limit the inactive (i.e. not extreme) outputs to −10 volts.

It should be noted that between interrogation cycles while a selected output line is being held, no standby current is required in the other output circuits, and the only current flowing is that feeding the selected output line. This is a great advantage, especially in arrangements where a large number of input and output lines are provided. Furthermore, it should be noted that the time of loading of the input lines is so brief as to be negligible for most purposes. No loading is presented by any input circuit after one output line has been selected. The only time during which any loading does occur is the brief instant immediately followng the interrogate pulse when the lowest input voltage is first turning on its associated thyristor latch. Once the thyristor conducts, even this loading disappears. A further important feature of the invention is that as many input lines as desired may be used. Many character recognition machines, for example, require an arrangement having perhaps forty or more input lines, and the present invention is ideal for such applications.

While the detailed circuit described above was designed to determine the least positive of many positive inputs, those skilled in the art will have no trouble making obvious changes in potential levels so that the circuit will select the least negative of many negative inputs, for example. Also, by using self-latching semi-conductors similar in function but opposite in polarity to the thyristor, the polarity of operation of the entire circuit may be reversed. Examples of alternative suitable semi-conductor switches are "Trigistors" (Solid State Products Co.) and Transwitches (Transitron) and various others. Use of such devices also would involve reversal in diode connections and supply potentials, and the use of an NPN driver instead of PNP transistor shown at Q–1, as will be readily apparent to those skilled in the art. Where input voltages can be limited to 1 or 2 volts, or less than the base-emitter breakdown ratings of the selected switches, input diodes D–101 to D–104 sometimes will be eliminated by those skilled in the art.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A selection circuit comprising:

(*a*) a substantially constant current source for providing a predetermined amount of current;

(*b*) a plurality of self-regenerative semiconductors, each of said semiconductors having a control terminal and first and second electrodes;

(*c*) a plurality of input lines, each of said input lines being connected to a respective one of said control terminals and directing varying voltages thereto;

(*d*) a plurality of output lines, each of said output lines being connected to a respective one of said first electrodes;

(*e*) an interrogation source for comparing the respective inputs to said semiconductors to determine which of said inputs is an extreme;

(*f*) an enabling circuit normally connecting said constant current source to said second electrodes to provide an excitation current for a single semiconductor of the plurality of semiconductors, said enabling circuit being operative to decouple said constant current source from semiconductors upon the receipt of a signal from said interrogation source, and, upon cessation of said signal to recouple said excitation current to said semiconductors, whereby said semiconductors whose input is an extreme will conduct and prevent the remaining semiconductors from conducting.

2. A device according to claim 1 wherein the predetermined amount of current is sufficient to excite only a single semiconductor.

3. A device according to claim 1 wherein the predetermined amount of current is sufficient to excite at least one of said semiconductors, but less than all of said semiconductors.

4. A device according to claim 1 wherein the semiconductor which conducts upon the cessation of the interrogation pulse is the semiconductor whose input is the least extreme.

5. An electronic selection circuit capable of selecting upon interrogation a single extreme voltage of a group of simultaneously applied input voltages of various magnitudes, comprising, in combination:

(*a*) a plurality of semiconductor latching devices each having a control terminal and first and second electrodes, each of said semiconductor latching devices comprising a avalanche-type semiconductor latch in which the control terminal potential is effective in determining the voltage between said electrodes at which said latch will conduct but substantially less effective to diminish current flow between said electrodes after conduction between said electrodes has occurred.

(*b*) first and second power supply means, each of said first electrodes of said latching devices being connected through an impedance to said first power supply means, (*c*) a plurality of input lines connected to receive respective varying input voltages, each of said input lines being connected to apply its input voltage to the control terminal of its associated semiconductor latching device;

(*d*) a plurality of output lines associated with respective input lines and connected to provide a unique output signal on a selected one of said output lines to indicate that said extreme voltage existed at the input line associated with said selected output line at an instant of interrogation, each of said output lines being connected to said first one of said electrodes of its associated semiconductor latching device;

(*e*) a common conductor, the second electrode of each of said semiconductor latching devices being connected to said common conductor;

(*f*) interrogation means for providing an interrogation pulse to determine which of said input lines is an extreme voltage; and (*g*) control means connected between said common conductor and said second power supply means and connected to receive said interrogation pulse, said control means being operable upon receipt of said interogation pulse to decrease the voltage between the electrodes of all of said latching devices and cut off all of said latching devices for the duration of said interrogation pulse, and thereafter to increase the voltage between the electrodes of all of said latching devices simultaneously, whereby the particular semiconductor latching device associated with the input line having said extreme voltage will conduct first and whereby conduction of said particular semiconductor prevents substantial further increase in voltage between the electrodes of said latching device and thereby prevents conduction of any other said latching devices.

6. An electronic selection circuit capable of selecting upon interrogation a single extreme voltage of a group of simultaneously applied input voltages of various magnitudes, comprising, in combination:

(*a*) a plurality of semiconductor latching devices each having a control terminal and first and second electrodes, (*b*) first, second and third power supply means, each of said first electrodes of said latching devices being connected through an impedance to said first power supply means, (*c*) a plurality of input lines connected to receive respective varying input voltages, each of said input lines being connected to apply its input voltage to the control terminal of its associated semiconductor latching device;

(*d*) a plurality of output lines associated with respective input lines and connected to provide a unique output signal on a selected one of said output lines to indicate that said extreme voltage existed at the input line associated with said selected output line at an instant of interrogation, each of said output lines being connected to said first one of said electrodes of its associated semi-conductor latching device;

(e) a common conductor, the second electrode of each of said semi-conductor latching devices being connected to said common conductor;

(f) interrogation means for providing an interrogation pulse to determine which of said input lines is an extreme voltage; and (g) control means connected between said common conductor and said second power supply means and connected to receive said interrogation pulse, said control means comprising a transistor having its collector-emitter circuit connected between said common conductor and said second power supply means, means for applying said interrogation pulse to its base, and a further impedance connected between said common conductor and said third power supply means, said control means being operable upon receipt of said interrogation pulse to decrease the voltage between the electrodes of all of said latching devices and cut off all of said latching devices for the duration of said interrogation pulse, and thereafter to increase the voltage between the electrodes of all of said latching devices simultaneously, whereby the particular semiconductor latching device associated with the input line having said extreme voltage will conduct first, whereby conduction of said particular semiconductor prevents substantial further increase in voltage between the electrodes of said latching device and thereby prevents conduction of any other of said latching devices.

7. An electronic selection circuit capable of selecting upon interrogation a single extreme voltage of a group of simultaneously applied input voltages of various magnitudes, comprising, in combination:

(a) a plurality of semiconductor latching devices each having a control terminal and first and second electrodes, (b) first and second power supply means, each of said first electrodes of said latching devices being connected through an impedance to said first power supply means, (c) A plurality of input lines connected to receive respective varying input voltages, each of said input lines being connected to apply its input voltage to the control terminal of its associated semiconductor latching device;

(d) a plurality of output lines associated with respective input lines and connected to provide a unique output signal on a selected one of said output lines to indicate that said extreme voltage existed at the input line associated with said selected output line at an instant of interrogation, each of said output lines being connected to said first one of said electrodes of its associated semiconductor latching device;

(e) a common conductor, the second electrode of each of said semiconductor latching devices being connected to said common conductor;

(f) a plurality of resistors, each of said resistors being connected between said common conductor and a respective one of said control terminals of said semiconduction latching devices;

(g) interrogation means for providing an interrogation pulse to determine which of said input lines is an extreme voltage; and (h) control means connected between said common conductor and said second power supply means and connected to receive said interrogation pulse, said control means being operable upon receipt of said interrogation pulse to decrease the voltage between the electrodes of all of said latching devices and cut off all of said latching devices for the duration of said interrogation pulse, and thereafter to increase the voltage between the electrodes of all of said latching devices simultaneously, whereby the particular semiconductor latching device associated with the input line having said extreme voltage will conduct first, and whereby conduction of said particular semiconductor prevents substantial further increase in voltage between the electrodes of said latching device and thereby prevents conduction of any other of said latching devices.

8. An electronic selection circuit capable of selecting upon interrogation a single extreme voltage of a group of simultaneously applied input voltages of various magnitudes, comprising, in combination:

(a) a plurality of semiconductor latching devices each having a control terminal and first and second electrodes, (b) first and second power supply means, each of said first electrodes of said latching devices being connected through an impedance to said first power supply means;

(c) a plurality of input lines connected to receive respective varying input voltages; each of said input lines being connected to apply its input voltage to the control terminal of its associated semiconductor latching device;

(d) a plurality of output lines associated with respective input lines and connected to provide a unique output signal on a selected one of said output lines to indicate that said extreme voltage existed at the input line associated with said selected output line at an instant of interrogation, each of said output lines being connected to said first one of said electrodes of its associated semiconductor latching device;

(e) interrogation means for providing an interrogation pulse to determine which of said input lines is an extreme voltage;

(f) a common conductor, said common conductor including a further impedance connected between first and second terminals, said first terminal being connected to said second electrodes of said latching devices, and a plurality of resistors connected between said second terminal and respective ones of said control terminals of said semiconductor latching switching devices; and (g) control means connected between said second terminal of said common conductor and said second power supply means and connected to receive said interrogation pulse, said control means being operable upon receipt of said interrogation pulse to decrease the voltage between the electrodes of all of said latching devices and cut off all of said latching devices for the duration of said interrogation pulse, and thereafter to increase the voltage between the electrodes of all of said latching devices simultaneously, whereby the particular semiconductor latching device associated with the input line having said extreme voltage will conduct first, and whereby conduction of said particular semiconductor prevents substantial further increase in voltage between the electrodes of said latching device and thereby prevents conduction of any other of said latching devices.

9. An electronic selection circuit capable of selecting upon interrogation a single extreme voltage of a group of simultaneously applied input voltages of various magnitudes, comprising, in combination:

(a) a plurality of semiconductor latching devices each having a control terminal and first and second electrodes;

(b) first and second power supply means, each of said first electrodes of said latching devices being connected through an impedance to said first power supply means;

(c) a plurality of input lines connected to receive respective varying input voltages, each of said input lines being connected to couple its input voltage to the control terminal of its associated semiconductor latching device;

(d) a plurality of diodes, each of said diodes being connected in series with a respective one of said input lines to isolate said input voltages from said control terminals;

(e) a plurality of output lines associated with respective input lines and connected to provide a unique output signal on a selected one of said output lines to indicate that said extreme voltage existed at the input line associated with said selected output line at an instant of interrogation, each of said output lines being connected to said first one of said electrodes of its associated semiconductor latching device;

(f) a common conductor, the second electrode of each of said semiconductor latching devices being connected to said common conductor;

(g) interrogation means for providing an interrogation pulse to determine which of said input lines is an extreme voltage; and (h) control means connected between said common conductor and said second power supply means and connected to receive said interrogation pulse, said control means being operable upon receipt of said interrogation pulse to decrease the voltage between the electrodes of all of said latching devices and cut off all of said latching devices for the duration of said interogation pulse, and thereafter to increase the voltage between the electrodes of all of said latching devices simultaneously, whereby the particular semiconductor latching device associated with the input line having said extreme voltage will conduct first, and whereby conduction of said particular semiconductor prevents substantial further increase in voltage between the electrodes of said latching device and thereby prevents conduction of any other of said latching devices.

10. An electronic selection circuit capable of selecting upon interrogation a single extreme voltage of a group of simultaneously applied input voltages of various magnitudes, comprising, in combination:

(a) a plurality of semiconductor latching devices each having a control terminal and first and second electrodes;

(b) first, second, third and fourth power supply means, each of said first electrodes of said latching devices being connected through an impedance to said first power supply means;

(c) a plurality of input lines connected to receive respective varying input voltages, each of said input lines being connected to apply its input voltage to the control terminal of its associated semiconductor latching device;

(d) a plurality of output lines associated with respective input lines and connected to provide a unique output signal on a selected one of said output lines to indicate that said extreme voltage existed at the input line associated with said selected output line at an instant of interrogation, each of said output lines being connected to said first one of said electrodes of its associated semiconductor latching device;

(e) a common conductor, the second electrode of each of said semiconductor latching devices being connected to said common conductor;

(f) interrogation means for providing an interrogation pulse to determine which of said input lines is an extreme voltage, and (g) control means connected between said common conductor and said second power supply means and connected to receive said interrogation pulse, said control means comprising a transistor having its collector-emitter circuit connected between said common conductor and said third power supply means, another impedance connected between said collector-emitter circuit of said transistor and said second power supply means, and a diode connected between said collector-emitter circuit and said fourth power supply means to maintain the voltage across said further resistor and the current through said collector-emitter substantially constant in the absence of an interrogation pulse; said control means being operable upon receipt of said interrogation pulse to decrease the voltage between the electrodes of all of said latching devices and cut off all of said latching devices for the duration of said interrogation pulse, and thereafter to increase the voltage between the electrodes of all of said latching devices simultaneously, whereby the particular semiconductor latching device associated with the input line having said extreme voltage will conduct first, and whereby conduction of said particular semiconductor prevents substantial further increase in voltage between the electrodes of said latching device and thereby prevents conduction of any other of said latching devices.

References Cited in the file of this patent

UNITED STATES PATENTS

| | | |
|---|---|---|
| 3,018,393 | Levy et al. | Jan. 23, 1962 |
| 3,092,732 | Milford | June 4, 1963 |
| 3,096,446 | Cohn | July 2, 1963 |